(12) United States Patent  (10) Patent No.: US 7,527,402 B2
Scown et al.  (45) Date of Patent: May 5, 2009

(54) INTEGRATED READING LIGHT AND PERSONAL AIR OUTLET

(75) Inventors: Stephen L. Scown, Edmonds, WA (US); David A. Young, Bellingham, WA (US)

(73) Assignee: The Boeing Company, Chicago, IL (US)

( * ) Notice: Subject to any disclaimer, the term of this patent is extended or adjusted under 35 U.S.C. 154(b) by 353 days.

(21) Appl. No.: 11/559,010

(22) Filed: Nov. 13, 2006

(65) Prior Publication Data

US 2008/0112155 A1    May 15, 2008

(51) Int. Cl.
*B60Q 1/00* (2006.01)
(52) U.S. Cl. .................... 362/480; 362/96; 362/523; 362/234
(58) Field of Classification Search ............... 362/459, 362/470, 480, 487, 253, 96, 800
See application file for complete search history.

(56) References Cited

U.S. PATENT DOCUMENTS

| | | | | |
|---|---|---|---|---|
| 2,153,242 A | * | 4/1939 | Dreyfuss | 362/480 |
| 4,142,227 A | | 2/1979 | Aikens | |
| 5,404,297 A | * | 4/1995 | Birk et al. | 362/421 |
| 5,664,872 A | * | 9/1997 | Spearman et al. | 362/96 |
| 5,934,783 A | * | 8/1999 | Yoshikawa | 362/96 |
| 6,655,823 B2 | * | 12/2003 | Chang | 362/487 |

\* cited by examiner

*Primary Examiner*—Ali Alavi
(74) *Attorney, Agent, or Firm*—Felix L. Fischer

(57) ABSTRACT

An integrated reading light and personal air outlet for a passenger service unit (PSU) employs a housing carried in the PSU with an air nozzle mounted within the housing and a light ring of light emitting diodes mounted to the housing surrounding the air nozzle. The housing is swivels in the PSU for orientation of a primary axis for directing a light beam from the LED light ring and the air nozzle separately swivels within the housing for orientation of a secondary axis for directing airflow from the nozzle.

20 Claims, 6 Drawing Sheets

INTEGRATED READING LIGHT AND PERSONAL AIR OUTLET

BACKGROUND OF THE INVENTION

1. Field of the Invention

This invention relates generally to the field of passenger service units for aircraft and, more particularly, to a PSU employing an integrated reading light concentric to an adjustable air outlet.

2. Description of the Related Art

Passenger service units are present on substantially all commercial aircraft in passenger service. For large aircraft, the number of PSUs can be very large and for high density seating arrangements compact arrangement of the elements in the PSU provides both space and weight savings. Reading lights 2 and Personal Air Outlet (PAO) 4 functionality are separate assemblies on all existing Passenger Service Unit (PSU) systems as shown in FIG. 1 of the application. This results in more weight and cost and requires more space to provide the necessary functions in the PSU system. It also affects the aesthetics of the overhead system due to the clutter with hundreds of parts over the passenger seats.

It is therefore desirable to provide integrated PSU components with reduced size and increased integration.

SUMMARY OF THE INVENTION

The present invention provides an integrated reading light and personal air outlet for a passenger service unit (PSU) having a housing mounted in the PSU with an air nozzle mounted within the housing and an LED light ring mounted to the housing surrounding the air nozzle. In exemplary embodiments, the housing is movably supported within the PSU to swivel for orientation of a primary axis for directing a light beam from the light ring and the air nozzle is mounted within the housing to swivel for orientation of a secondary axis for directing airflow from the nozzle. The nozzle incorporates a flow adjustment ring, an outer circumferential surface of the adjustment ring providing a grasping surface for swiveling the air nozzle. The light ring incorporates a rotary switch on an external circumference thereof with an outer surface of the switch providing a grasping surface for swiveling the housing.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
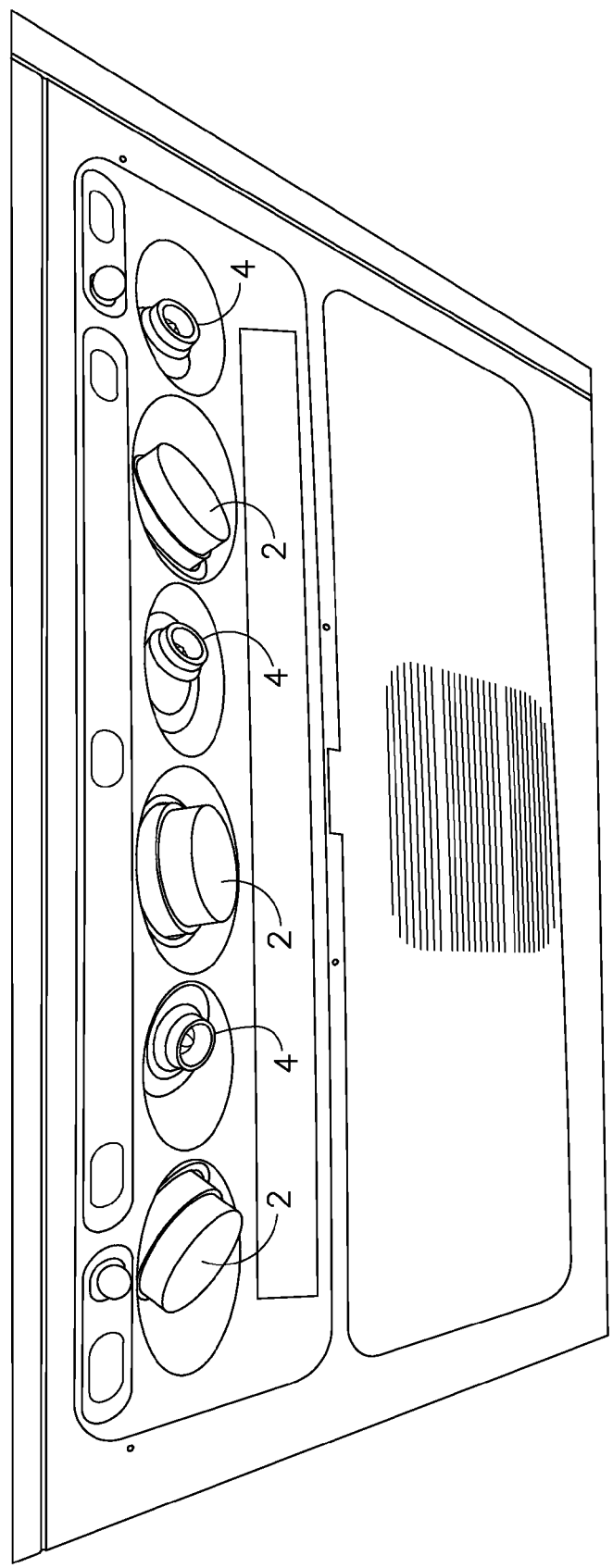
FIG. 1 is an pictorial view of exemplary Prior Art PSU systems.
Figure 2:
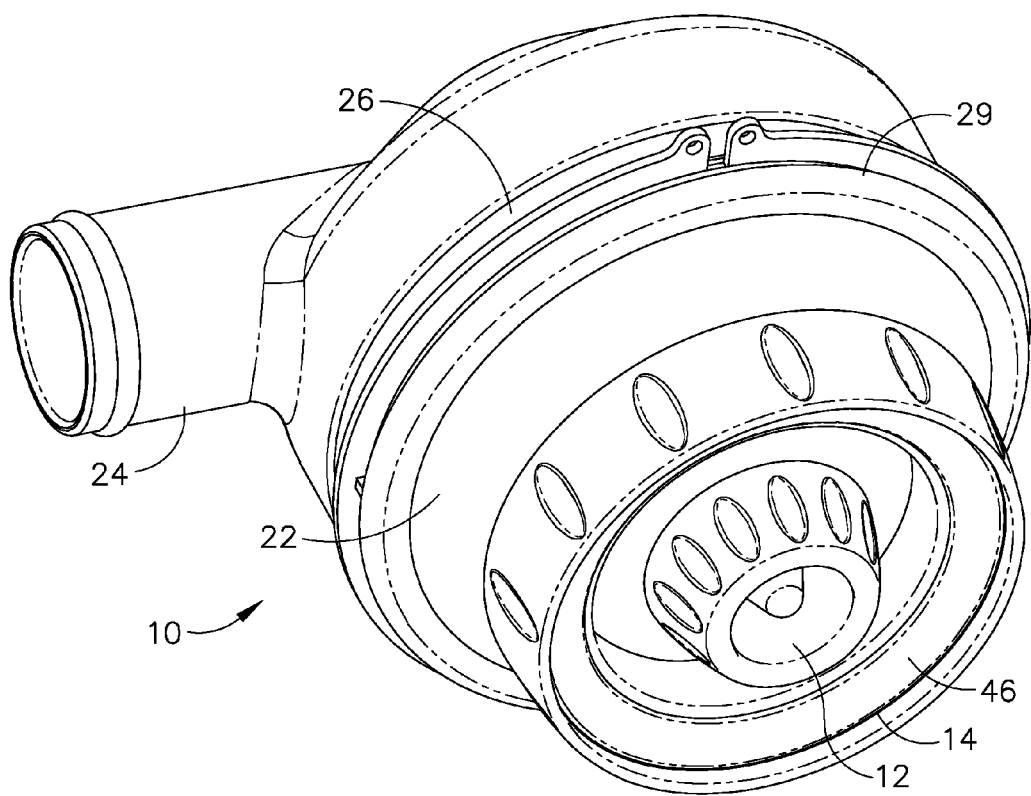
FIG. 2 is an isometric view of an embodiment of the invention.
Figure 4:
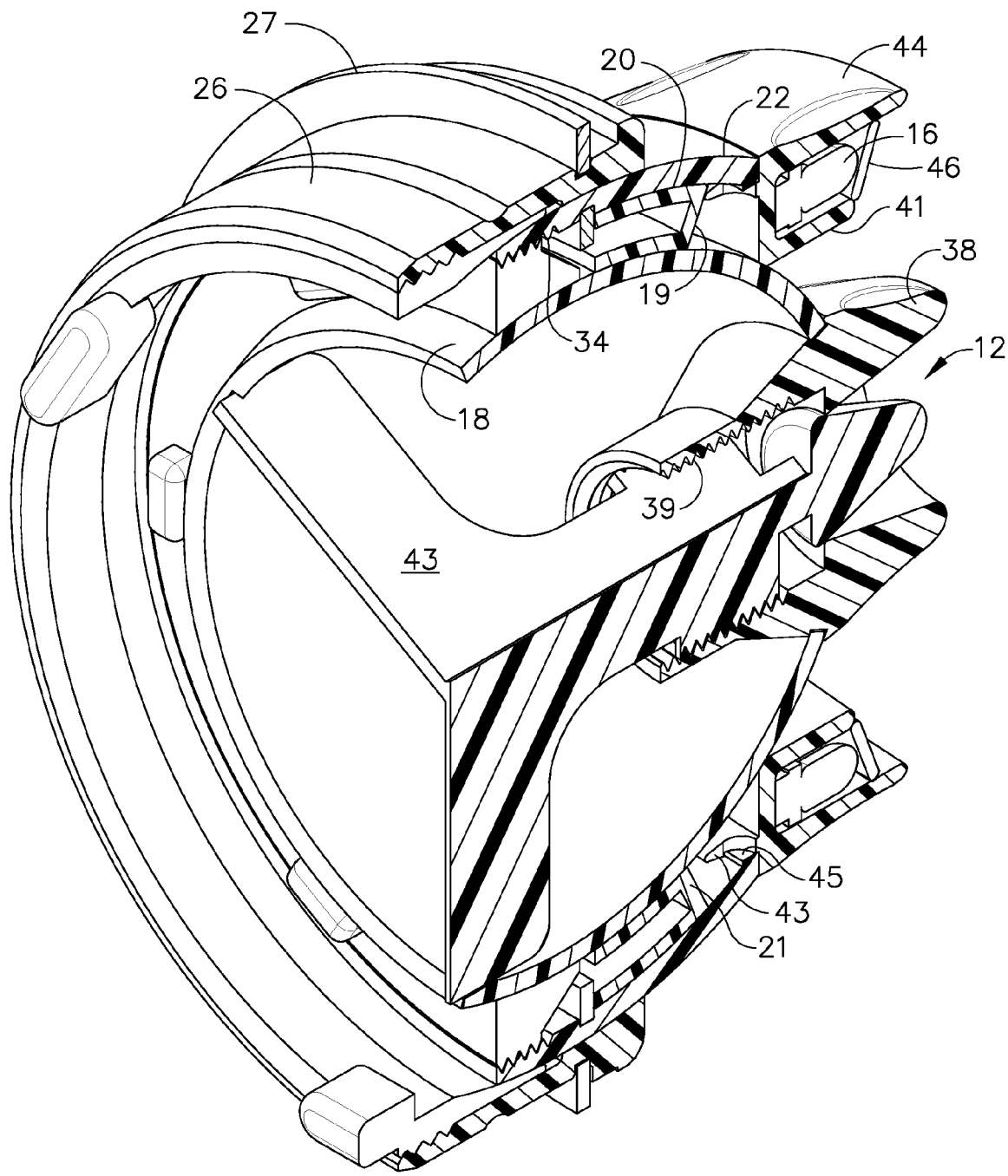
FIG. 4 is an isometric rear section view of the embodiment of the invention shown in FIG. 2.

As shown in FIGS. 2 and 4, the present invention provides an integrated light and air assembly 10 for an aircraft PSU which employs a personal air outlet (PAO) 12 concentrically surrounded by a light ring 14 employing multiple individual light emitting diodes (LEDs) 16 as light sources for the embodiment shown. The PAO incorporates a partial spherical body 18 which, for the embodiment shown in the drawings, is carried in an inner race 19 providing a front hemispherical engagement having an outer element 20 suspended by a partial spherical surface 21 in a housing 22 of the integrated assembly. A snap ring 23 secures the outer element of the inner race to the housing and a threaded insert 25 provides a rear hemispherical engagement to secure the body in the inner race. A connector 24 extends from the housing for attachment to a duct in the low pressure low volume air system contained within the PSU fascia or cabin ceiling of the aircraft. The housing also employs a substantially spherical section to be carried in a truncated spherical outer race 26 which is suspended in the face plate 32 of PSU as will be described in greater detail subsequently.

Figure 3:
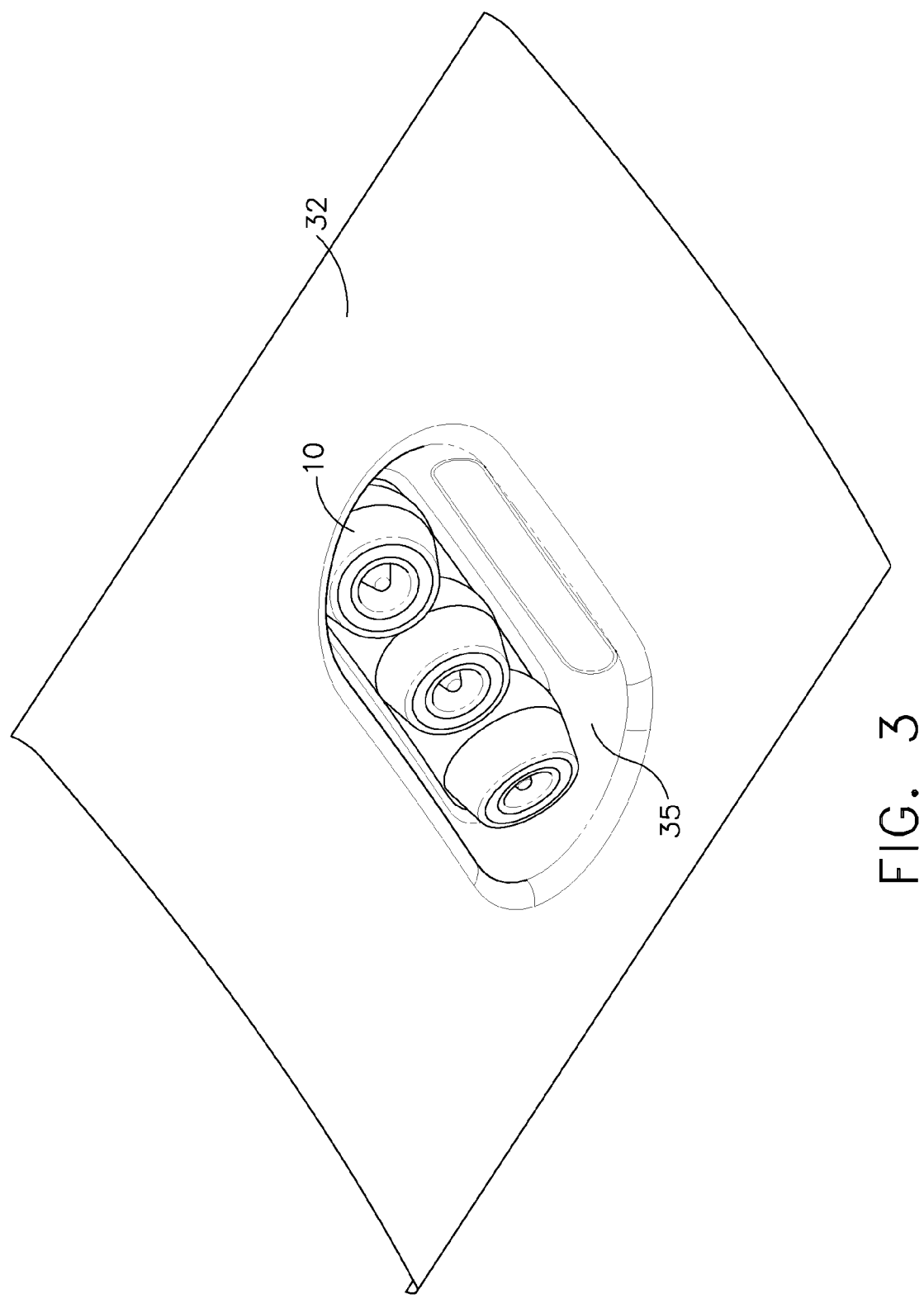
FIG. 3 is a pictorial view of one embodiment of a PSU employing the present invention.

A PSU employing the present invention is significantly simplified over the prior art as shown in FIG. 3. For the embodiment shown, three integrated reading light and personal air units 10 according to the invention are mounted in an angled recess 35 in the PSU panel. Use of integral controls and switches as will be described in greater detail subsequently, allow elimination of separate switch elements providing a compact and simplified structure.

The interfaces between the PAO sphere and cavity and the housing and race are lubricious to allow swiveling of the integrated system elements for direction of the airflow from the PAO and the light beam from the LED ring as desired by the passenger. The dimensional tolerance of the housing and race provide a higher tension for rotation of the housing within the race than the tension for rotation of the PAO sphere within its mating cavity to allow the PAO airflow to be readily adjusted without impacting the directional orientation of the light beam.

Figure 5:
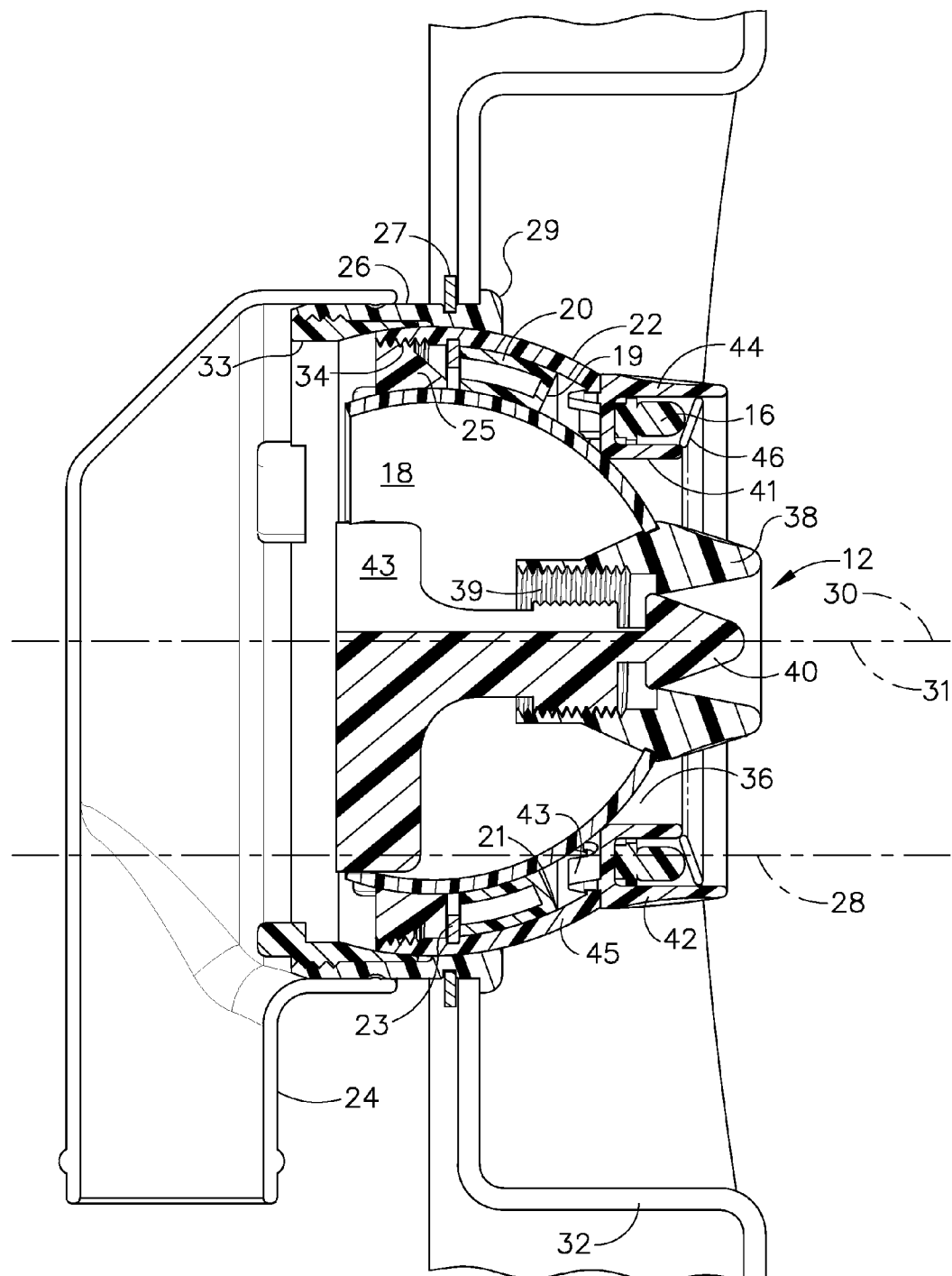
FIG. 5 is an elevation section view of the embodiment of the invention.

Unlike conventional PSU lighting systems employing incandescent light sources, including the system disclosed in U.S. Pat. No. 4,142,227 which provided a concentric arrangement, reflector systems are not required by the LED ring. The individual LEDs are projection devices which provide a directed beam. Orientation of the LED beam axis 28 for each LED with respect to an axis of symmetry 30 of the LED ring is accomplished to provide desired overall beam breadth from the LED ring as shown in FIG. 5. The axis of symmetry 31 for airflow from the PAO nozzle is coincident with the light ring axis in FIG. 5. Swiveling the PAO body within the housing allows a divergence of the airflow axis and the light ring axis. The directional orientation of the beam from each individual LED allows tailoring of the beam pattern for optimum use in reading. The ring in the embodiment shown in the drawings is circular, however, in alternative embodiments other geometric shapes are employed to further tailor the beam shape. An exemplary rectangular arrangement provides a flattened beam geometry which is further adjustable by the passenger by rotationally swiveling the housing in addition to swiveling the pointing axis for the beam.

Unlike the system disclosed in U.S. Pat. No. 4,142,227 which provided a concentric arrangement with a large nozzle surrounded by an incandescent lamp, this nozzle is compact and surrounded by the light source. This compact nozzle provides high velocity air from existing low pressure air distribution systems and provides the ability to aim the light and nozzle individually.

Figure 6:
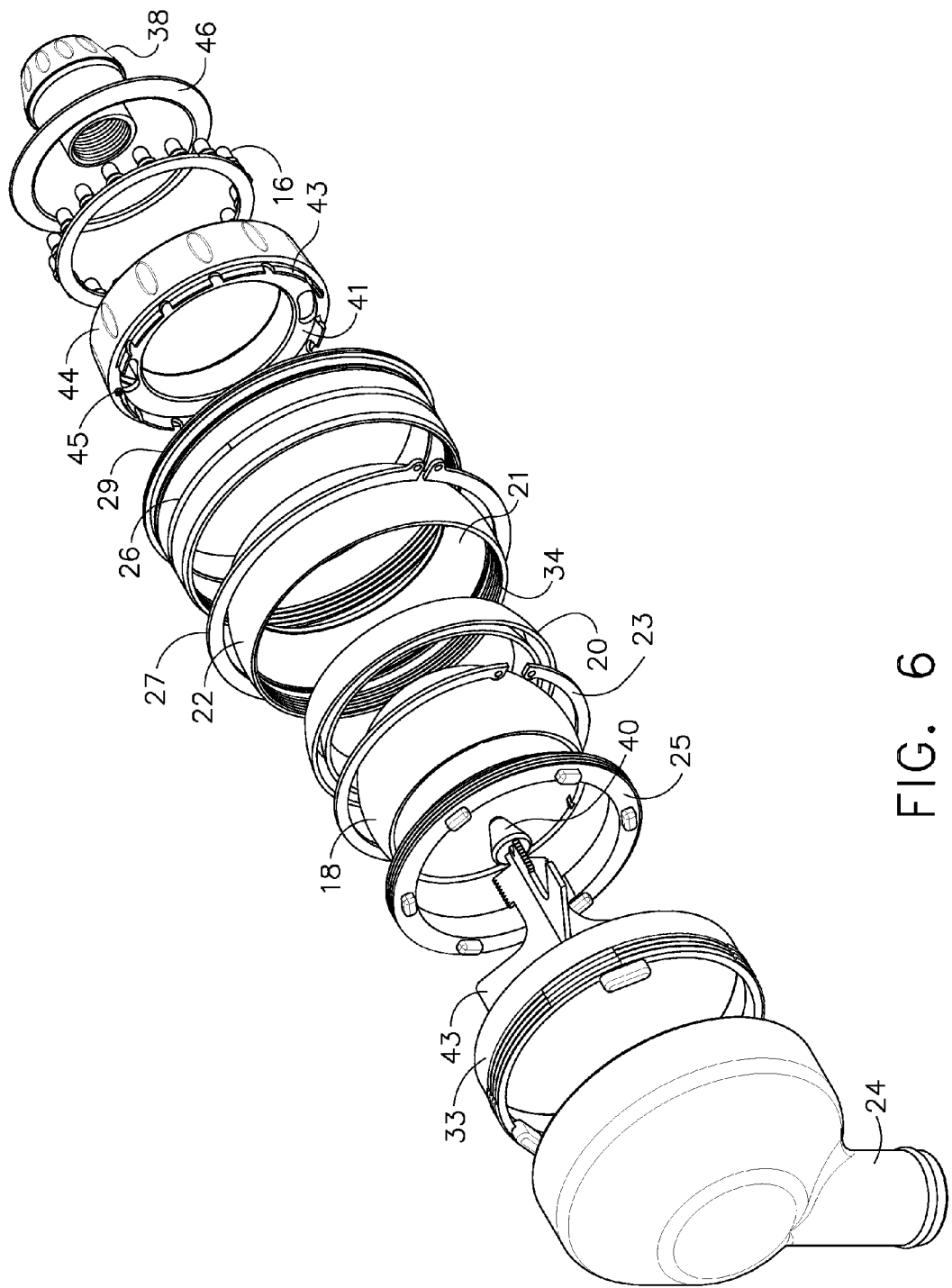
FIG. 6 is an exploded view of the elements of the embodiment of the invention.

As shown for the exemplary embodiment in FIGS. 4, 5 and 6, the swivel mounting for the housing is provided using race 26 mounted within the PSU. For the embodiment shown, the rim of the aperture in the recess is engaged intermediate a snap ring 27 and a circumferential ridge 29 on the race. The housing is a truncated spherical shape to allow an aperture 34 to provide air flow through the body 18 for the personal air outlet which is exposed through a second opposing aperture 36 in the housing. For the embodiment shown, the race incorporates a threaded insert 33 which provides a rear hemispherical support for the housing and secures the housing within the race. Connector 24 is attached to race 26 for the embodiment shown. Light ring 14 surrounds the second aperture with electrical connection for the light sources routed through the housing. While shown as complete concentric ring elements in the embodiment of the drawings, reduced surface section contact rings or pads are employed in alternative embodiments to suspend the body within the housing and the housing within its race while retaining the multidirectional rotation capability to swivel the body and the housing.

The PAO incorporates a nozzle flow adjustment ring 38 rotatably mounted in the body which constricts flow from the nozzle by adjustment of the ring inner surface relative to a substantially conical strake 40. Threaded interconnection 39 of the ring and strake allows the relative motion between the nozzle elements for flow adjustment. Ring 38 also acts as the grasping surface for swiveling the PAO for adjusting the axis of air flow. As seen in FIGS. 4, 5 and 6, a vane set 43 assists in airflow direction into the nozzle.

The light ring for the embodiment shown houses the LEDs in a circular channel 41 which incorporates a rotary switch/dimmer in a bezel 42 for activation and light level adjustment on the LEDs. For the embodiment shown, the bezel is supported by tines 43 which engage an inner lip 45 on the aperture in the housing allowing rotation of the bezel. As with the nozzle flow adjustment ring, the dimpled circumferential surface 44 of the switch/dimmer bezel provides a grasping surface for swiveling of the housing to direct the axis of the light beam and rotating the bezel. A dimple 45 (best seen in FIG. 6) extending inward from the bezel provides an electrical switch stop element. Ribs or wings on the circumferential surface of the switch/dimmer are added in alternative embodiments for additional friction or leverage in operating the switch and swiveling the housing for directing the light beam. A cover lens 46 is employed in the embodiment shown to provide a clean appearance for the LED ring and blend individual beams from the separate LEDs. Various optical properties can be provided in the lens to further focus or diffuse the LED beams.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An integrated reading light and personal air outlet comprising:
    a housing mounted in a passenger service unit (PSU);
    an air nozzle mounted within the housing;
    a plurality of light sources in a ring mounted to the housing and surrounding the air nozzle.

2. An integrated reading light and personal air outlet as defined in claim 1 wherein the housing is mounted within the PSU to swivel for orientation of a primary axis for directing a light beam from the light ring and the air nozzle is mounted within the housing to swivel for orientation of a secondary axis for directing airflow from the nozzle.

3. An integrated reading light and personal air outlet as defined in claim 2 wherein the nozzle incorporates a flow adjustment ring, an outer circumferential surface of said adjustment ring providing a grasping surface for swiveling the air nozzle.

4. An integrated reading light and personal air outlet as defined in claim 2 wherein the light ring incorporates a rotary switch on an external circumference thereof, an outer surface of said switch providing a grasping surface for swiveling the housing.

5. An integrated reading light and personal air outlet as defined in claim 1 wherein the light ring is comprised of a plurality of light emitting diodes.

6. An integrated reading light and personal air outlet as defined in claim 1 wherein the housing is a partial spherical element mounted in a race secured to a face plate in the PSU.

7. An integrated reading light and personal air outlet as defined in claim 6 wherein the air nozzle incorporates a partial spherical body mounted in an inner race secured within the housing.

8. An integrated reading light and personal air outlet as defined in claim 7 wherein the air nozzle further incorporates a nozzle flow adjustment ring rotatably mounted in the body and engaging a conical strake with threaded interconnection for air flow adjustment.

9. An integrated reading light and personal air outlet as defined in claim 8 further comprising a vane connected to the strake for directional control of airflow in the body.

10. An integrated reading light and personal air outlet as defined in claim 6 wherein the race provides a front hemispherical surface receiving the housing and incorporates a rear hemispherical insert to secure the housing in the race.

11. An integrated reading light and personal air outlet as defined in claim 10 wherein the air nozzle incorporates a partial spherical body mounted in an inner race secured within the housing, the inner race having a front hemispherical surface receiving the body and incorporates a second rear hemispherical insert to secure the body in the inner race.

12. An integrated reading light and personal air outlet comprising:
    a swiveling housing received in a socket assembly in a passenger service unit;
    an LED light ring mounted to the housing, a beam from said light ring oriented in a desired direction by positioning of the swiveling housing;
    an air nozzle having a swiveling body received within the housing and having an air outlet within a circumference of the light ring, airflow from the nozzle oriented in a second desired direction by positioning of the swiveling body.

13. An integrated reading light and personal air outlet as defined in claim 12 wherein the nozzle incorporates a flow adjustment ring, an outer circumferential surface of said adjustment ring providing a grasping surface for swiveling the body of the air nozzle.

14. An integrated reading light and personal air outlet as defined in claim 12 wherein the light ring incorporates a rotary switch on an external circumference thereof, an outer surface of said switch providing a grasping surface for swiveling the housing.

15. A passenger service unit comprising:
    a plurality of socket assemblies;
    a swiveling housing received in each socket assembly;
    an LED light ring mounted to the housing and having a rotary switch on an external circumference thereof, an outer surface of said switch providing a grasping surface for swiveling the housing to orient a beam from said light ring in a desired direction;

an air nozzle having a swiveling body received within the housing and having an air outlet within a circumference of the light ring and having a flow adjustment ring, an outer circumferential surface of said adjustment ring providing a grasping surface for swiveling the body of the air nozzle for orientation of air flow from the nozzle in a second desired direction.

16. An integrated reading light and personal air outlet as defined in claim 15 wherein the housing is a partial spherical element mounted in a race secured to a face plate in the PSU and the air nozzle incorporates a partial spherical body mounted in an inner race secured within the housing.

17. An integrated reading light and personal air outlet as defined in claim 16 wherein the race provides a front hemispherical surface receiving the housing and incorporates a rear hemispherical insert to secure the housing in the race.

18. An integrated reading light and personal air outlet as defined in claim 17 wherein the inner race has a front hemispherical surface receiving the body and incorporates a second rear hemispherical insert to secure the body in the inner race.

19. An integrated reading light and personal air outlet as defined in claim 16 wherein the air nozzle further incorporates a nozzle flow adjustment ring rotatably mounted in the body and engaging a conical strake with threaded interconnection for air flow adjustment.

20. An integrated reading light and personal air outlet as defined in claim 19 further comprising a vane connected to the strake for directional control of airflow in the body.

* * * * *